(12) United States Patent
Turng et al.

(10) Patent No.: US 8,097,191 B2
(45) Date of Patent: Jan. 17, 2012

(54) INJECTION MOLDING QUALITY CONTROL SYSTEM

(75) Inventors: Lih-Sheng Turng, Madison, WI (US); Zhongbao Chen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1223 days.

(21) Appl. No.: 11/460,758

(22) Filed: Jul. 28, 2006

(65) Prior Publication Data

US 2008/0023861 A1    Jan. 31, 2008

(51) Int. Cl.
*B29C 45/80* (2006.01)
(52) U.S. Cl. ............... 264/40.5; 264/40.3; 264/40.6; 264/328.1
(58) Field of Classification Search .................. None
See application file for complete search history.

(56) References Cited

U.S. PATENT DOCUMENTS

| | | | |
|---|---|---|---|
| 4,135,873 A * | 1/1979 | Sone et al. ............... | 425/147 |
| 4,767,300 A * | 8/1988 | Buja et al. ............... | 425/140 |
| 4,816,197 A | 3/1989 | Nunn | |
| 5,008,052 A * | 4/1991 | Harada .................. | 264/40.5 |
| 5,063,008 A | 11/1991 | Wenskus, Jr. et al. | |
| 5,756,019 A * | 5/1998 | Nakazawa et al. ......... | 264/40.5 |
| 6,019,917 A | 2/2000 | Ryckebusch et al. | |
| 7,037,452 B1 | 5/2006 | Speight | |
| 2002/0008329 A1* | 1/2002 | Shioiri et al. ............. | 264/40.1 |

OTHER PUBLICATIONS

Bulgrin, T.C. and T.H. Richards. IEEE Trans. on Industrial Appl., 31 (6), 1350-1357 (1995).
Chen, X., G. Chen and F. Gao. Polym. Eng. Sci., 44, 1571-1578 (2004).
Chen, Z.B. and L.S. Turng. Advances in Poly. Tech. 24 (3), 165-182 (2005).
Chen, Z.B. and L.S. Turng. SPE ANTEC, 697-701 (2005).
Chen, Z.B., L.S. Turng and K.K. Wang. Polym. Eng. Sci., 46 (5), 263 (2006).
Chiang, H.H., C.A. Hieber, and K.K. Wang, Polym. Eng. Sci., 31, 1571-1578 (1991).
Edwards, R. and C.L. Thomas, Polym Eng. & Sci., 41 (9), 1644-1653 (2001).
Gao, F., W.I. Patterson and M.R. Kamal. Polym. Eng. Sci., 36 (9), 1272-1285 (1996).
Havard, N., J.E. Fournier, M.F. Lacrampe et al., PPS-21, Leipzig, Germany, Jun. 19-23, 2005.
Havlicsek, H. and A. Alleyne. IEEE/ASME Trans. on Mechatronics, 4 (3), 312-323 (1999).
Kamal, M.R., A.E. Varela, and W.I. Patterson, Polym Eng. & Sci., 39 (5), 940-952 (1999).
Kelly, A.L., M. Woodhead and P.D. Coates. Polym. Eng. Sci., 45, 857-865 (2005).
Liang, J.M. and P.J. Wang, J. Inject. Molding Tech., 6 (1), 58-71 (2002).

(Continued)

*Primary Examiner* — Monica A Huson
(74) *Attorney, Agent, or Firm* — Craig A. Fieschko, Esq.; DeWitt Ross & Stevens S.C.

(57) ABSTRACT

An injection molding quality control system which seeks to ensure greater accuracy and consistency in parts, more specifically more accurate and consistent part weight, utilizes measured part weight to adjust mold separation to better achieve a desired part weight. The mold separation is controlled via both a cycle-to-cycle adjustment in switchover point (preferably based on injected mass within the cavity), and within-cycle adjustment of holding pressure. The system can result in superior accuracy and consistency in molded parts in both the long term (i.e., over many cycles) and in the short term (from cycle to cycle).

18 Claims, 2 Drawing Sheets

OTHER PUBLICATIONS

Michaeli, W. and J. Gruber. SPE ANTEC, 688-692 (2004).
Sheth, H.R.; Nunn, R.E., J. Inject. Molding Tech., 5 (3), 141-151 (2001).
Wang, K.K. et al., CIMP Progress Report, No. 10, Cornell University, 1984.
Wang, K.K. et al., CIMP Progress Report, No. 21, Cornell University, 2000.
Wang, K.K., J. Zhou, and Y. Sakurai. SPE ANTEC, 611-615 (1999).
Wenskus, J.J., J. Inject. Molding Tech., 1 (3), 151-157 (1997).
Woll, S.L.B. and D.J. Cooper. Polym. Eng. Sci., 37 (5), 801-812 (1997).
Yang, Y. and F. Gao. Control Engineering Practice, 8, 1285-1296 (2000).
Yang, Y. and F. Gao, Polym. Eng. Sci., 46 (4), 540-548 (2006).

* cited by examiner

INJECTION MOLDING QUALITY CONTROL SYSTEM

STATEMENT REGARDING FEDERALLY SPONSORED RESEARCH

This invention was made with United States government support awarded by the following agencies:
NSF (National Science Foundation) Grant No(s): 0332696
The United States has certain rights in this invention.

FIELD OF THE INVENTION

This document concerns an invention relating generally to injection molding systems, and more specifically to injection molding control systems for seeking more accurate and consistent parts between injection cycles.

BACKGROUND OF THE INVENTION

Injection molding is a well-known method for forming plastic articles (which will be generically referred to herein as "parts"). The injection molding process can usually be regarded as including the following steps:

(1) A clamping step, wherein portions of a mold are brought together to define a mold cavity into which molten plastic is to be injected.

(2) A filling or injection step, wherein plastic is injected into the mold via a sprue (the entry to the mold), runners (one or more passages branching out from the sprue), and gates (one or more openings from which the runners open onto the mold cavity). Injection can be achieved in a number of different ways depending on the configuration of the injection molding apparatus. A common arrangement, which will be assumed as an example throughout the remainder of this document, is to have a screw which is rotatable within a barrel (which is generally provided with heaters about the barrel circumference), and which is also translatable within the barrel by a hydraulic ram. Plastic feedstock is fed into the barrel (generally by a hopper) and sheared, mixed and melted by the action of the rotating screw and the heaters. The screw and ram retreat within the barrel as the screw's rotation urges molten plastic to the front of the barrel, and then injection is effected by pushing the screw forward on the ram, injecting the molten plastic into the sprue at the front of the barrel. The ram (and screw) movement is usually controlled to attain a desired velocity profile—usually constant velocity—in an attempt to achieve desired flow of molten plastic within the cavity (e.g., a uniform melt front). Once the mold cavity is filled (or is believed to be filled), the filling/injection step is completed, with the time of completion often being referred to as the "switchover point" or "switchover point." Since the switchover point, i.e., the nominal time of complete cavity filling, often cannot be determined precisely (at least without expensive sensors and/or other equipment modifications), it is usually set with reference to a closely related process or machine parameter—for example, it may be set at some preset distance by which the ram and screw have advanced (or some preset time after the ram and screw have advanced), at some pressure measured by a sensor within the mold cavity or injection barrel, on the ram, etc.

(3) A packing or holding step, wherein a small amount of additional plastic is packed to compensate for shrinkage (e.g., by urging the screw forward in the barrel by an additional small amount). Here, the ram (and thus the screw) are usually moved forward via pressure control, i.e., to attain some desired packing or holding pressure within the mold cavity, rather than via velocity control.

(4) A cooling and recovery step, wherein the plastic within the mold is allowed to at least partially cool and solidify, and the screw injector begins recharging with additional plastic material. Some cooling may also be regarded as occurring during the packing/holding step, though the cooling/recovery step may be regarded as distinct from the holding/packing step, and as occurring once the plastic at the gate(s) has solidified (i.e., as occurring once no more plastic can be admitted to the mold cavity).

(5) A mold opening step, wherein the mold opens.

(6) An ejection step, wherein the molded part is ejected from the mold cavity, often by one or more pins in the mold cavity walls being actuated to push the part from the mold cavity.

The injection molding cycle can then repeat, starting over at step (1) above. Note that the various steps above can be combined, subdivided, or otherwise altered or recharacterized; see, e.g., the discussion provided in U.S. Pat. No. 7,037,452.

Naturally, it is highly desirable for the injection molding process to result in parts which are uniform from cycle to cycle, and which have high dimensional accuracy and otherwise suitable qualities. Such qualities have previously been sought by implementing control schemes which attempt to control machine and/or process parameters (e.g., mold pressure, temperature, etc.) so that subsequent injection cycles are uniform, with the assumption being that if the machine operates in the same manner with each cycle, uniform quality will result. However, even where plastic feedstock is uniform (and thus factors such as varying feedstock density do not play a role), uniform quality has proven to be a difficult goal to attain owing to variations in machine, process, and material (plastic) parameters from cycle to cycle.

One factor that has been found to be a useful indicator of molded part quality is part weight. Research has found that variations in part weight are highly correlated with variations in part dimensions (which are usually undesirable, assuming part uniformity is desired). Thus, part weight often serves as an effective indicator of part dimensional uniformity, and thus part quality. Prior injection molding control schemes have been implemented wherein machine and process parameters are adapted after each cycle in response to the measured part weight, and such schemes are useful in eliminating long-term quality discrepancies (in that part nonuniformities are usually reduced or eliminated within a few cycles). However, short-term discrepancies still exist: some parts will vary from their desired quality targets, and while these generate error signals which are then used to adjust parameters and correct for the discrepancies in subsequent cycles, it would nonetheless be beneficial to further eliminate discrepancies and enhance part quality.

SUMMARY OF THE INVENTION

The invention, which is defined by the claims set forth at the end of this document, is directed to an injection molding system and an associated control process which at least partially alleviate the aforementioned problems. A basic understanding of some of the preferred features of the invention can be attained from a review of the following brief summary of the invention, which discusses exemplary versions of the invention, and makes reference to the accompanying drawings to assist the reader's understanding. More details on further versions of the invention are then provided elsewhere in this document.

Referring to FIG. 1, an exemplary injection molding system wherein the invention may be implemented is schematically depicted in simplified form at the reference numeral 100. The injection molding system 100 includes a multi-section mold 102, wherein the sections 102a and 102b may be brought together to define a mold cavity 104. An injector 106 is provided to inject plastic into the mold cavity 104 during a molding cycle, and is depicted with a barrel 108 having several heating bands 110, a plastic supply hopper 112, and an internal screw 114 driven by a ram 116. One or more separation sensors 118 (e.g., LVDT sensors) are provided to measure the mold separation between the sections 102a and 102b of the mold 102 when the sections are brought together. A processor 120, e.g., a personal or other computer, programmable logic control, or other device for implementing control over the molding processes of the injection molding system 100 is also provided. Also depicted is a weight sensor 122 for weighing molded parts produced by the injection molding system, here simply shown as a scale/load cell situated beneath the mold 102 to weigh each molded part after it is ejected from the mold (with the weight of the molded part closely corresponding to the weight of the plastic injected into the mold to produce the molded part).

The processor 120 includes several controllers (i.e., control schemes for certain machine, process, and quality parameters) programmed or otherwise provided therein, and these are depicted in the control diagram of FIG. 2a and the state block diagram of FIG. 2b. Initially, a switchover controller 200 sets a switchover point S/O for the injector 106, wherein the injector 106 injects plastic into the mold cavity 104 at a defined velocity until the switchover point S/O, and packs the plastic at a defined pressure thereafter. The switchover point S/O is set and modified in dependence on the mold separation measured by the separation sensor(s) 118 between the sections 102a and 102b of the mold 102, with the mold separation defining a feedback signal MSFeedback used (in conjunction with a desired mold separation signal MSRef) to modify the switchover point S/b if the mold separation MSFeedback differs from the desired value MSRef. Thus, the switchover controller 200 monitors the mold separation during each cycle, and controls the switchover point from cycle to cycle to seek the desired mold separation MSRef.

The desired mold separation command signal MSRef is itself varied from cycle to cycle, partially in response to the part weight Wt measured by weight sensor 122, and partially in accordance with process parameters measured during each cycle's injection. e.g., the melt (plastic) temperature and the mold temperature. As for the part weight Wt, this is used as feedback WtFeedback in conjunction with a desired part weight signal WtRef to generate an error signal Wterr, which in turn is used by a part weight controller 202 to generate a portion of MSRef (the portion $MS^{fb}max\_ref$). As for the other portion of the mold separation command signal MSRef, the portion $MS^{did}max\_ref$, this is preferably generated by a compensator (controller) 204 which utilizes process parameters such as the plastic (melt) temperature Tm, generated by the melt temperature sensor 124 in FIG. 1, and the mold temperature Tw, generated by the mold temperature sensor 126 in FIG. 1, in conjunction with the desired part weight signal WtRef. The compensator 204 therefore helps adjust the desired mold separation command signal MSRef to compensate for process disturbances which would not be accounted for in the current cycle if only part weight feedback WtFeedback was used.

It is also preferred that the holding pressure Pp of the plastic within the mold 102, which is measured by pressure sensor 128, also be modified after the switchover point S/O if the mold separation MSFeedback differs from the desired value MSRef. Thus, a holding controller 206 controls the holding pressure Pp of the plastic in accordance with a mold separation error MSerr generated from the mold separation command MSRef and the mold separation MSFeedback measured by the separation sensor(s) 118. Here, the control of the holding pressure Pp is preferably implemented not from cycle to cycle, but within each cycle itself, to seek the desired mold separation value MSRef.

As will be further discussed below, the foregoing control scheme provides significant improvements in both long-term and short-term part weight accuracy and consistency. Further features and advantages of the invention will be apparent from the remainder of this document in conjunction with the associated drawings.

BRIEF DESCRIPTION OF THE DRAWINGS

FIG. 2b is a global nonlinear state block diagram further illustrating the control scheme depicted in FIG. 2a.

DETAILED DESCRIPTION OF PREFERRED VERSIONS OF THE INVENTION

Figure 2A:
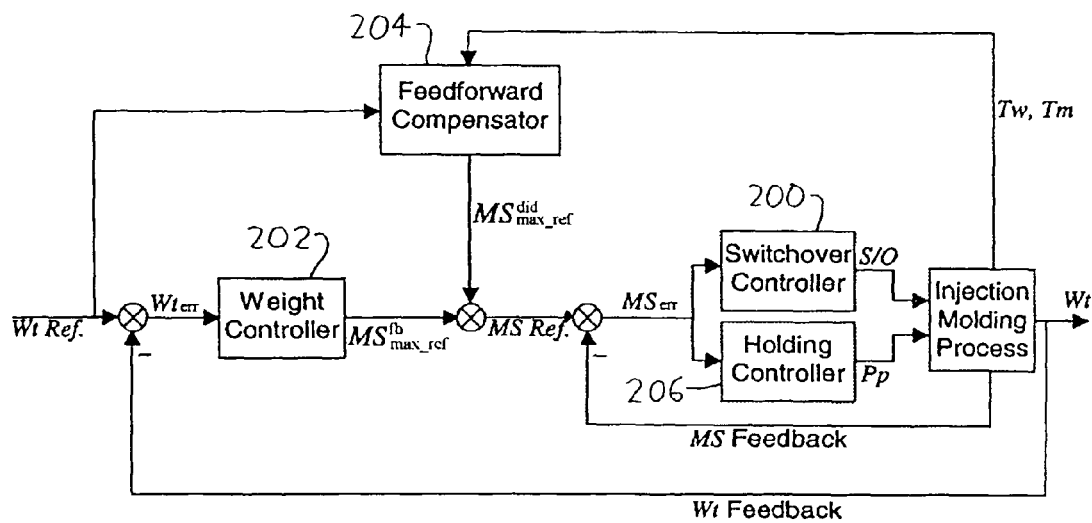
FIG. 2a is a schematic control diagram depicting a preferred control scheme for the injection molding system of FIG. 1.

To review the foregoing discussion in greater detail, FIG. 2a illustrates a preferred cascade closed-loop system with direct quality feedback and disturbance feedforward for online quality control of injection molding. At the outer loop, the part weight Wt is regulated by manipulating the maximum mold separation MSRef from shot to shot (cycle to cycle). As discussed in prior studies, e.g., in Chen, Z. B., L. S. Turng and K. K. Wang, Polym. Eng. Sci., 46 (5), 263 (2006), part weight is highly correlated with mold separation, and thus mold separation is a useful quantity to control to achieve desired part weight. Further, as previously noted, part weight Wt can be regarded as a proxy for part quality, and thus this outer loop may be regarded as a quality control loop.

However, since mold separation alone cannot account for all variations in part weight—for example, studies by the inventors have found that melt temperature and mold temperature also affect the correlation between part weight and mold separation—the inner loop is further used to enhance weight (and thus quality) control. At the inner loop, which may be regarded as a process control loop, the maximum mold separation is used to scale the whole mold separation profile during filling and holding and the whole mold separation profile is taken as a signature of the injection molding process. The mold separation profile, including the maximum mold separation MSRef, is controlled via both cycle-to-cycle control of switchover S/O and within-cycle holding control (i.e., control of holding pressure Pp). First, the switchover point S/O is adjusted from cycle to cycle (based on injected mass) to at least partially achieve the required maximum mold separation MSRef. After the switchover point S/O, the holding pressure Pp is adjusted to duplicate the desirable mold separation profile, which is normalized by scaling the maximum mold separation value of the profile to the required maximum value. In this way, long-term disturbances are prevented in cycle-to-cycle control, and short-term disturbances are compensated for by the within-cycle control.

Figure 1:
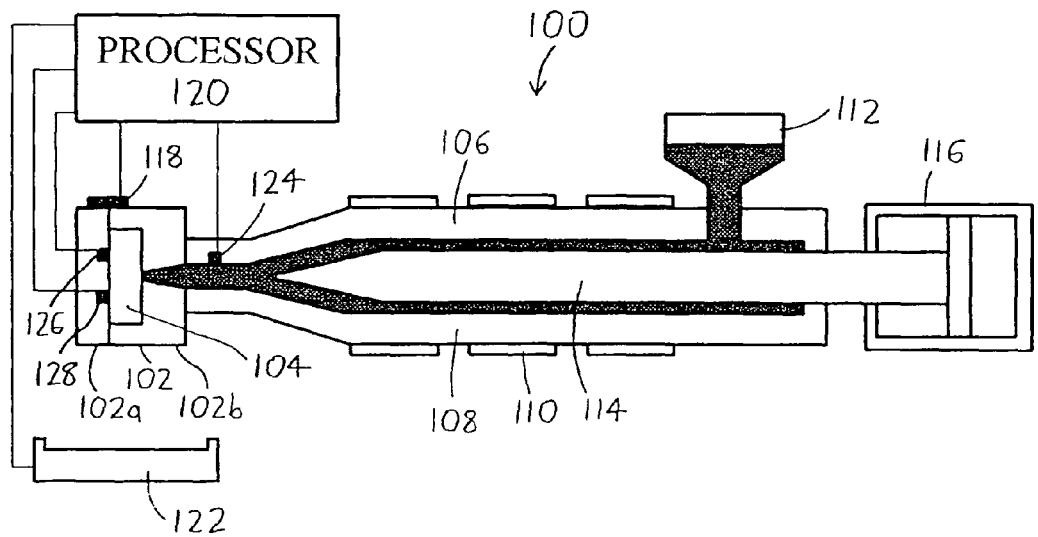
FIG. 1 is a schematic depiction of an exemplary injection molding system wherein the invention may be implemented.

Referring to FIG. 1, mold separation (shown as MSfeedback) can be measured by displacement/proximity sensors 118 such as LVDTs. Melt temperature Tm can be captured from the plastic in the injector 106 by use of a melt temperature sensor 124 such as a thermocouple, and the mold temperature Tw can similarly be captured from the mold wall or other suitable location by a mold temperature sensor 126. Holding pressure Pp, and more generally the pressure within the mold cavity 104, can be monitored by use of one or more pressure transducers 128 distributed about the mold cavity 104 (preferably flush mounted with respect to the interior cavity wall).

Control of switchover S/O within the switchover controller 200 can be based on parameters such as time during injection, injector pressure, or ram position. However, switchover S/O is most preferably controlled in accordance with the mass of the injected plastic, since this parameter is believed to have a more direct bearing on mold separation MS than time, pressure, or position alone: experiments have found that if maximum mold separation is plotted versus injected mass at switchover, the resulting data points fall roughly along a straight line, indicating that a simple proportional model can be used to define the relationship between these parameters. Injected mass may then be calculated in accordance with:

$$m_{inj} = A\left(\frac{l_0}{v_o(T,p)} - \frac{l_0}{v_s(T,p)}\right) \quad (1)$$

where $m_{inj}$ is the injected plastic mass, A is the cross-sectional area of the injector barrel 108, $l_0$ is the position of the ram 116 at the start of filling, $l_s$ is the position of the ram 116 at switchover S/O, and $v_0$ and $v_s$ are respectively the specific volumes of the plastic at the start of filling and at switchover. Parameters $v_0$ and $v_s$ are functions of temperature and pressure, and can be calculated from the chosen plastic's pvT (pressure-specific volume-temperature) property relationship given the melt temperature Tm and pressure P. The plastic's pvT properties can be conveniently modeled by a two-domain, modified Tait equation, as described in Cheng, H. H., C. A. Hieber, and K. K. Wang, Polym. Eng. Sci. 31, 1571 (1991).

Then, as discussed above, a pure proportional element can be employed to model the maximum mold separation MSmax:

$$\Delta MS_{max} = K \Delta m_{inj} \quad (2)$$

The proportional gain, K, can be obtained from experimental data derived from several injection cycles using the plastic and injection molding system 100 in issue.

As discussed above, melt temperature Tm and mold temperature Tw are further variables apart from mold separation that also have an impact on part weight. Studies by the inventors have found that there is a roughly linear correlation between part weight and maximum mold separation, but at the same time, melt temperature Tm and mold temperature Tw affect both the slope and the interception of the correlating line. A simple relationship between these variables can be expressed as:

$$Wt = Wt_0 + a_1[MS] + a_2[Tm] + a_3[Tw] + a_4[MS][Tm] + a_5[MS][Tw] \quad (3)$$

wherein the coefficients $a_1$, $a_2$, $a_3$, $a_4$, and $a_5$ can also be experimentally determined for a given injection molding system 100. Equation (3), and the derived coefficients, can then be programmed into or otherwise used in the compensator 204

Figure 2B:
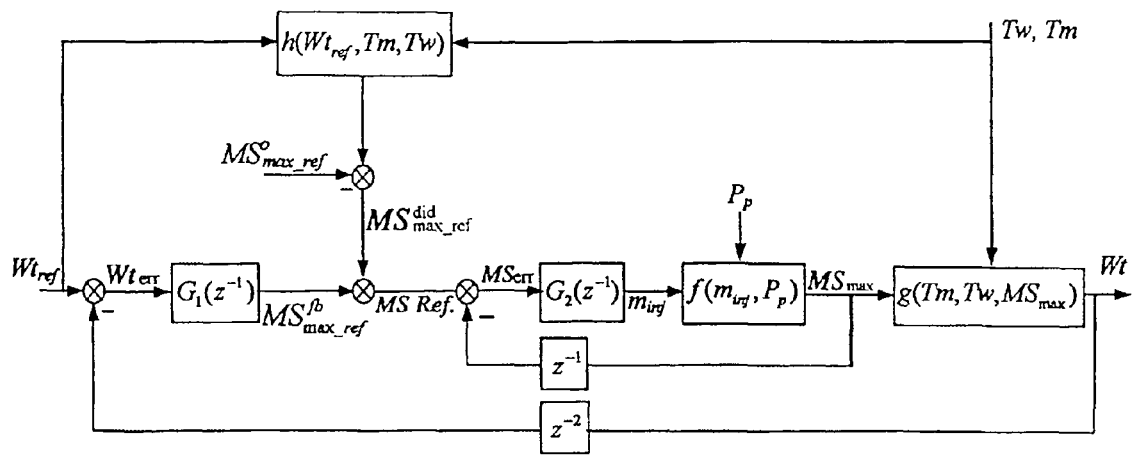

Turning to FIG. 2b, the global nonlinear block diagram of the quality control system is depicted. However, note that since this diagram depicts cycle-to-cycle control, the within-cycle post-filling control is not shown. The part weight controller 202 is depicted by $G_1(z^{-1})$, and controller $G_2(z^{-1})$ is used in control of mold separation. The function $f(m_{inj}, Pp)$ models the dependence of the maximum mold separation MSmax on switchover point S/O and holding pressure Pp. The function g(Tm, Tw, MSmax) expresses part weight in terms of mold temperature Tw, melt temperature Tm, and the maximum mold separation MSmax. The equation $h(Wt_{ref}, Tm, Tw)$ (=MSmax) is converted from g(Tm, Tw, MSmax) (=Wt). The blocks $z^{-1}$ and $z^{-2}$ are backward shift operators; note that there is a one-cycle delay in the MSfeedback loop due to the intrinsic nature of cycle-to-cycle control, and a two-cycle delay exists in the weight feedback loop because of the need to measure part weight after each cycle. The whole system can be divided into several sub-parts as follows:

Weight Controller:

$$MS_{max\_ref}^{fb} = G_1(z^{-1})[Wt_{ref} - Wt z^{-2}] \quad (4)$$

where $MS_{max\_ref}^{fb}$ is the feedback component of the maximum mold separation command MSRef.

Mold Separation Controller:

$$m_{inj} = G_2(z^{-1})[MS_{max\_ref}^{fb} + MS_{max\_ref}^{did} - MS_{max} z^{-1}] \quad (5)$$

where $MS_{max\_ref}^{did}$ is the disturbance input decoupling or feedforward component of the maximum mold separation command MSRef.

Disturbance Input Decoupling or Feedforward Compensator:

$$MS_{max\_ref}^{did} = h(Wt_{ref}, Tm, Tw) - MS_{max\_Ref}^{0} \quad (6)$$

where $MS_{max\_ref}^{0}$ is the maximum MS reference corresponding to the required weight under nominal conditions.

Process (Mold Separation) Object:

$$MS_{max} = f(m_{inj}, Pp) \quad (7)$$

Quality (Weight) Object:

$$Wt = g(MS_{max}, Tw, Tm) \quad (8)$$

Equations (5) and (6) are already in linear form and Eqs. (6) to (8) can be linearized. Next, a linear operating point model can be obtained, as expressed in Eqs. (9) to (13):

$$\Delta MS_{max\_ref}^{fb} = -G_1(z^{-1}) \Delta Wt z^{-2} \quad (9)$$

$$\Delta m_{inj} = G_2(z^{-1})\left[\Delta MS_{maax\_ref}^{fb} + \Delta MS_{max\_ref}^{ff} - \Delta MS_{max} z^{-1}\right] \quad (10)$$

$$\Delta MS_{max\_ref}^{did} = -\frac{\hat{b}_1}{\hat{a}_1}\Delta Tm - \frac{\hat{c}_1}{\hat{a}_1}\Delta Tw \quad (11)$$

$$\Delta MS_{max} = K_{SM}\Delta m_{inj} + K_{SP}\Delta Pp \quad (12)$$

$$\Delta Wt = a_1 \Delta MS_{max} + b_1 \Delta Tm + c_1 \Delta Tw \quad (13)$$

where $\hat{a}_1, \hat{b}_1$, and $\hat{c}_1$ are estimations of $a_1$, $b_1$, and $c_1$, respectively. The coefficient $K_{SP}$ equals $$\frac{\partial f}{\partial Pp}.$$

Figure 2C:
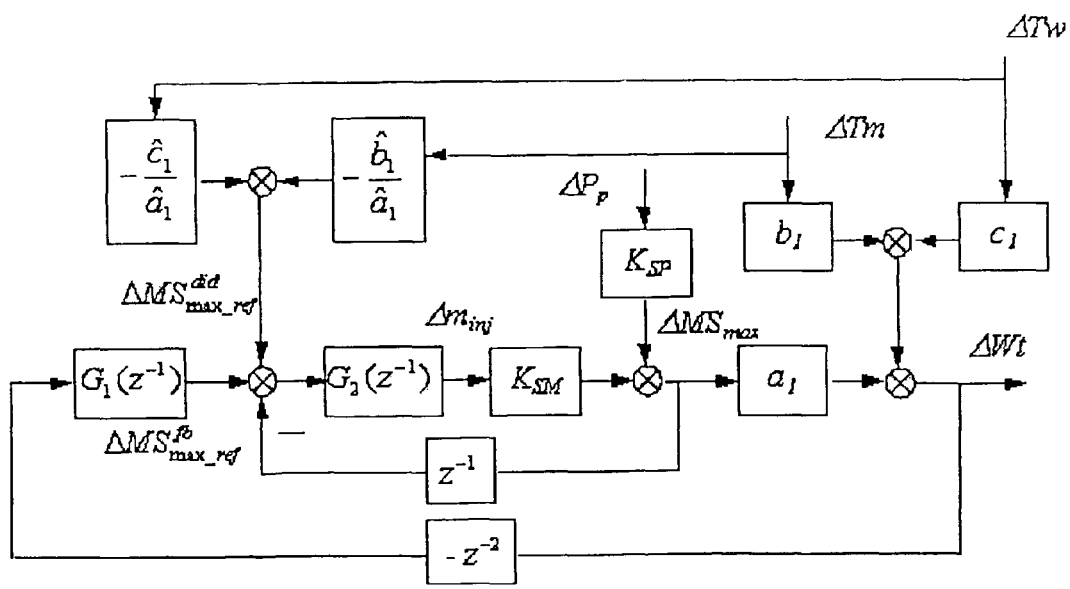
FIG. 2c is the operating point state block diagram of the control scheme of FIG. 2b.

From these equations, the state block diagram of the operating point model for closed-loop quality feedback control can be readily drawn in FIG. 2c, which has the same structure as FIG. 2b. The weight variation is related to the external inputs through $$\Delta W t \left( \frac{1}{a_1} + \frac{1}{a_1} K_{SM} G_2 z^{-1} + K_{SM} G_2 G_1 z^{-2} \right) = \qquad (14)$$
$$K_{SP} \Delta P_p + (1 + K_{SM} G_2 z^{-1}) \left( \frac{b_1}{a_1} \Delta Tm + \frac{c_1}{a_1} \Delta Tw \right) K_{SM} -$$
$$K_{SM} G_2 \left( \frac{\hat{b}_1}{\hat{a}_1} \Delta Tm + \frac{\hat{c}_1}{\hat{a}_1} \Delta Tw \right)$$

To eliminate the temperature effects on weight variations, the mold separation controller $G_2(z^{-1})$ is preferably designed to be an integrator:

$$G_2(z^{-1}) = \frac{1}{\hat{K}_{SM}(1 - z^{-1})} \qquad (15)$$

where $\hat{K}_{SM}$ is the estimation of $K_{SM}$. In the ideal situation, the weight variation due to temperature changes can be eliminated entirely.

The weight controller $G_1(z^{-1})$ is designed to keep the system stable and have good dynamic performance. It preferably takes the form of a PI controller, as $$G_1(z^{-1}) = K_P + \frac{K_1}{1 - z^{-1}} \qquad (16)$$

where $K_P$ and $K_I$ are the proportional gain and integration gain, respectively. The characteristic equation of the system is $$z^3 - (1+\epsilon)z^2 + [(a_1 K_P + a_1 K_I)(1-\epsilon)+\epsilon]z - (1-\epsilon)a_1 K_P = 0 \qquad (17)$$

where $$\varepsilon = 1 - \frac{K_{SM}}{\hat{K}_{SM}}.$$

The controller gains $K_P$ and $K_I$ are determined under the nominal condition $\epsilon=0$. Note that there are only two design parameters in Eq. (17), but it has three characteristic roots. Thus, not all characteristic roots can be freely placed. There is one constraint in this pole-placement, namely, $$z_1 + z_2 + z_3 = 1 \qquad (18)$$

where $z_1$, $z_2$, and $z_3$ are the characteristic roots. It is still possible to put all three roots in stable positions (within the unit cycle on the complex z-plane). For instance, if the characteristic roots are 0.4, 0.3, and 0.3, the corresponding controller gains are $$\begin{cases} K_P = \dfrac{0.036}{a_1} \\ K_1 = \dfrac{0.294}{a_1} \end{cases} \qquad (19)$$

When $a_1$ is not available, it can be replaced by its estimation, $\hat{a}_1$.

With all controllers properly designed based on the process and quality models, the closed-loop quality control system performance, such as the dynamic stiffness and robust stability, can be readily analyzed.

Since the foregoing discussion and accompanying drawings merely relate to preferred versions of the invention, it should be understood that the invention may take other forms as well. As one example, since the injection molding system 100 is merely a simplified schematic depiction, the invention may be implemented in injection molding systems having radically different appearance from the one depicted. The measured parameters used for control (e.g., mold separation MS, holding pressure Pp, mold temperature Tw, and melt temperature Tm) can be measured by one or more sensors at locations other than those depicted. Further, the control relationships and physical process modeling relationships discussed above may be replaced with other appropriate arrangements.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A multi-cycle injection molding process for a multi-section mold, the process comprising the steps of:
   a. injecting plastic into the mold during each cycle, wherein such injection:
      (1) occurs at a controlled velocity until a switchover point, and
      (2) occurs at a controlled pressure after the switchover point;
   b. monitoring the mold separation between the sections of the mold during each cycle with a separation sensor; and
   c. adjusting the switchover point in the following cycle in dependence on the mold separation in the current cycle to seek a desired mold separation.

2. The process of claim 1 further comprising the step of adjusting a holding pressure of the plastic within the mold during each cycle after the switchover point to further seek the desired mold separation.

3. The process of claim 1 further comprising the steps of:
   a. monitoring at least one of:
      (1) the temperature of the plastic, and
      (2) the temperature of the mold;
   b. generating therefrom a mold separation command signal at least partially corresponding to the desired mold separation, the mold separation command signal being used to at least partially adjust the switchover point in the following cycle to seek the desired mold separation.

4. The process of claim 3 further including the steps of:
   a. measuring the weight of the molded plastic in a prior cycle;
   b. generating the mold separation command signal therefrom, wherein the mold separation command signal is also generated from a reference part weight command signal corresponding to a desired weight of the plastic within the mold during each cycle.

5. The process of claim 3:
   a. further comprising the step of adjusting a holding pressure of the plastic within the mold,
   b. wherein the mold separation command signal is also used to at least partially adjust the holding pressure.

6. The process of claim 3 further comprising the steps of:
   a. adjusting a holding pressure of the plastic within the mold during each cycle after the switchover point to further seek the desired mold separation; and b. using the mold separation command signal to adjust the holding pressure from cycle to cycle to seek the desired mold separation.

7. The process of claim 1:
   a. wherein the weight of the plastic injected into the mold is measured at the end of each cycle, and
   b. further comprising the step of controlling the desired mold separation from cycle to cycle in response to:
      (1) the measured plastic weight, and
      (2) a desired plastic weight.

8. The process of claim 7 wherein:
   a. the weight of the plastic injected into the mold is supplied to an electronic processor, and
   b. the processor controls the desired mold separation from cycle to cycle,
   whereby the desired mold separation is automatically controlled.

9. A multi-cycle injection molding process for a multi-section mold, the process comprising the steps of:
   a. injecting plastic into the mold during each cycle, wherein such injection:
      (1) occurs at a controlled velocity until a switchover point, and
      (2) occurs at a controlled holding pressure after the switchover point;
   b. monitoring the mold separation between the sections of the mold during each cycle with a separation sensor; and
   c. if the mold separation differs from a desired value, adapting both:
      (1) the switchover point, and
      (2) the holding pressure,
      to seek the desired mold separation value.

10. The process of claim 9 wherein the switchover point is adapted between cycles to seek the desired mold separation value.

11. The process of claim 9 wherein the holding pressure is adapted during each cycle to seek the desired mold separation value.

12. The process of claim 9 wherein:
    a. the switchover point is adapted between cycles, and
    b. the holding pressure is adapted during each cycle,
    to seek the desired mold separation value.

13. The process of claim 9 further comprising the steps of:
    a. monitoring at least one of:
       (1) the temperature of the mold, and
       (2) the temperature of the plastic; and
    b. generating a mold separation command signal which is at least partially dependent on the temperature of the mold and the temperature of the plastic, the mold separation command signal being used to at least partially control the switchover point.

14. The process of claim 9 further comprising the steps of:
    a. monitoring at least one of:
       (1) the temperature of the mold, and
       (2) the temperature of the plastic; and
    b. generating a mold separation command signal which is at least partially dependent on the temperature of the mold and the temperature of the plastic, the mold separation command signal being used to at least partially control the holding pressure.

15. A multi-cycle injection molding process for a multi-section mold, the process including the following steps:
    a. injecting plastic into the mold during each cycle, wherein such injection:
       (1) occurs at a defined velocity until a switchover point, and
       (2) occurs at a defined holding pressure after the switchover point;
    b. monitoring the mold separation between the sections of the mold during each cycle, and
    c. adjusting the switchover point in the following cycle in dependence on the mold separation in the current cycle to adapt the mold separation closer to a desired mold separation value.

16. The process of claim 15 further including the step of adjusting the holding pressure to adapt the mold separation closer to a desired mold separation value.

17. The process of claim 15 further including the steps of:
    a. monitoring at least one of:
       (1) the temperature of the plastic, and
       (2) the temperature of the mold;
    b. generating therefrom a mold separation command signal therefrom, the mold separation command signal:
       (1) being at least partially dependent on the monitored temperature, and
       (2) being used to at least partially control one or more of:
          i. the holding pressure, and
          ii. the switchover point.

18. The process of claim 15 further including the steps of:
    a. measuring the weight of the molded plastic in a prior cycle;
    b. generating the mold separation command signal from:
       (1) the measured weight, and
       (2) a reference part weight command signal corresponding to a desired weight of the plastic within the mold during each cycle.

* * * * *

UNITED STATES PATENT AND TRADEMARK OFFICE
CERTIFICATE OF CORRECTION

PATENT NO. : 8,097,191 B2  Page 1 of 1
APPLICATION NO. : 11/460758
DATED : January 17, 2012
INVENTOR(S) : Lih-Sheng Turng and Zhongbao Chen It is certified that error appears in the above-identified patent and that said Letters Patent is hereby corrected as shown below:

Title page item (75), under Inventors, please delete "Zbongbao" and replace it with --Zhongbao--.

Signed and Sealed this
Twentieth Day of March, 2012

David J. Kappos
*Director of the United States Patent and Trademark Office*